G. S. DOTY & J. D. SHOW.

ELASTIC TIRE.

APPLICATION FILED NOV. 10, 1911.

Reissued May 14, 1912. 13,419.

Witnesses.—
William H. Rivoi.
Wills A. Burrows.

Inventors.—
Giles S. Doty.
John D. Show.
by their Attorneys.—
Howson & Howson

UNITED STATES PATENT OFFICE.

GILES S. DOTY AND JOHN D. SHOW, OF PHILADELPHIA, PENNSYLVANIA, ASSIGNORS TO D. & S. AIRLESS TIRE COMPANY, A CORPORATION OF DELAWARE.

ELASTIC TIRE.

13,419. Specification of Reissued Letters Patent. Reissued May 14, 1912.

Original No. 1,002,046, dated August 29, 1911, Serial No. 601,889. Application for reissue filed November 10, 1911. Serial No. 659,663.

*To all whom it may concern:*

Be it known that we, GILES S. DOTY and JOHN D. SHOW, citizens of the United States, and residents of the city and county of Philadelphia, State of Pennsylvania, have invented certain new and useful Improvements in Elastic Tires, of which the following is a specification.

This invention relates to tires and more particularly to resilient tires.

The object of the invention is the provision of a tire of this character which will have a resiliency equal to the present form of pneumatic tire and which will not be affected by puncture.

A further object of the invention is the provision of a tire of this character formed in the manner of outer casings for pneumatic tires and having inwardly projecting ribs adapted to be separated upon depression of the tire, together with elastic means for holding the projections together.

A still further object of the invention is the provision of a cushion tire with walls adapted to be separated upon depression of the tire, said tire being adapted to be readily connected and removed from the wheel rim and having means adapted to resist and absorb heavy shocks.

Further objects of the invention will appear as the following specification is read in connection with the accompanying drawing, which forms a part of this application, and in which:—

Figure 1:
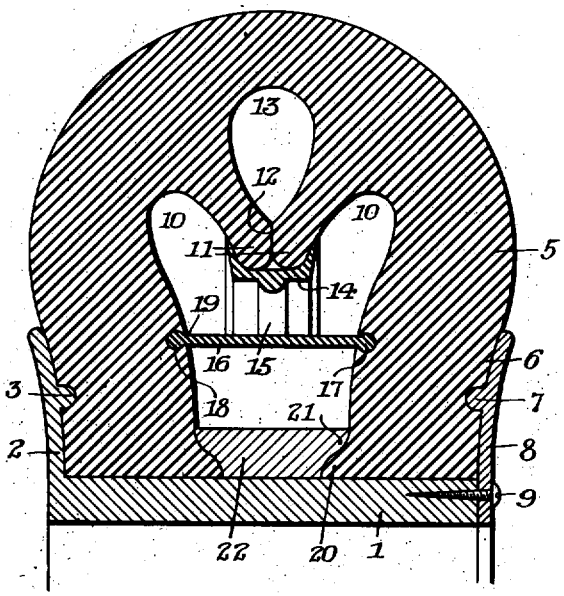
Figure 2:
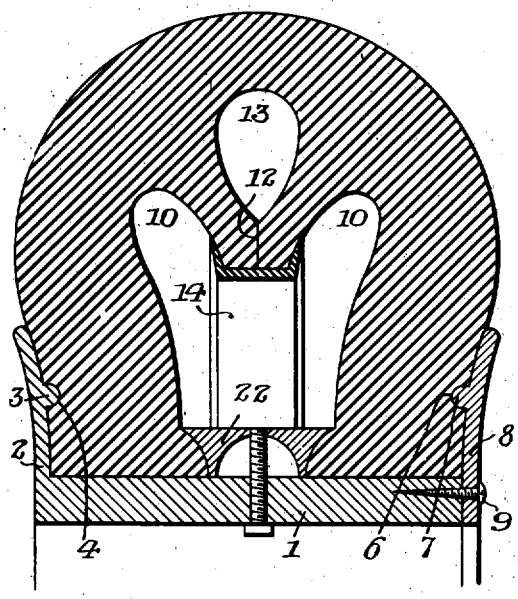
Figure 3:
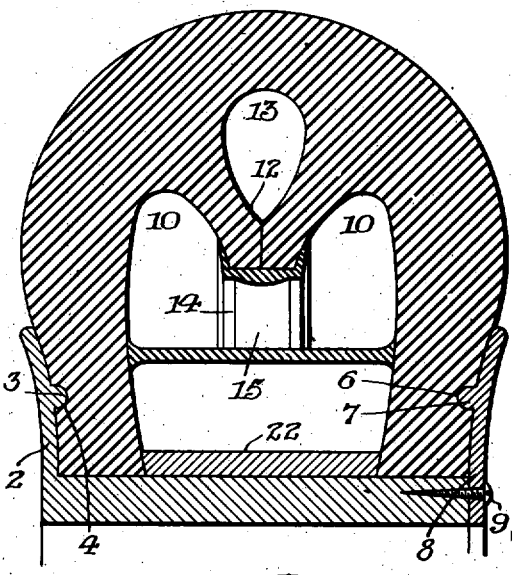

Figure 1 is a transverse section through the tire; Fig. 2 is a similar view showing a modified form, and Fig. 3 is a similar view showing a further modification.

Referring more particularly to the drawing, 1 represents the rim or tire of the wheel which has secured to and projecting from one side thereof a flange 2 having an embossed rib 3 thereon. This rib is adapted to engage an annular groove 4 formed in the cushion tire 5. The tire 5 is substantially horseshoe-shaped in cross section and the opposite leg from that having the groove 4 is provided with a groove 6 which is engaged by a rib 7 formed on a locking ring 8. This locking ring is adapted to be secured to the tire or rim 1 in any suitable manner, as by bolts 9, as shown. The separated legs of the tire form an annular concavity 10 into which project from the upper inner surface of the tire the separated annular ribs 11. These ribs, integral with the tire wall and semi-rigid in character, converge and engage one another, as shown at 12, and form an annular chamber 13 closed from communication with the cavity 10 and thus forming an air pocket as will be readily seen from an inspection of the drawings.

Connecting the ribs 11 together is an elastic webbing 14 which is secured to the outer sides of the ribs by vulcanizing, or in any other suitable manner, and this webbing is provided, in the center, in certain of the embodiments of our invention shown in the drawings, with a longitudinal rib 15 which is bridged between the ribs 11. This reinforcing rib is adapted to widen out when stretched as will be hereinafter described so as to absorb heavy shocks and properly reinforce the webbing.

Extending across the cavity 10 and connecting the separated legs is an elastic webbing 16 having each of its outer edges provided with a circular reinforcing rib 17 adapted to be secured in a pocket 18 formed in each leg of the tire and having a restricted mouth 19. This webbing is connected in position across the cavity 10 by bending the lower ends of the legs outwardly until the mouths 19 are sufficiently enlarged to permit the passage of the ribs 17. The webbing 14 and the webbing 16 are continuous annular members, as are the ribs 15 and 17 formed thereon.

When the tire is depressed under the weight of the vehicle the ribs 11 will be projected toward the rim 1 and separated against the tendency of the webbing 14 to hold the same together and when excessive shocks are communicated to the tire the ribs 11 will extend inwardly far enough to engage the webbing 16 which will prevent the tire from collapsing and will absorb the shock instead of having it transmitted through the wheels to the vehicle.

In order to prevent the legs of the tire from coming together the inner portion of the legs are provided with inwardly extending annular ribs 20 which are engaged by flanges 21 formed on the ring 22 which surrounds and is removably mounted upon the rim 1. This ring may be held in place in any suitable manner but it is believed that in practice it will be found unnecessary to connect the ring to the rim, the engagement on each side by the tire being sufficient to hold it from lateral displacement.

We claim:

1. A tire comprising a hollow annular member, independent semi-rigid projections extending into the tire, and a reinforced resilient band connecting said projections and adapted to expand upon separation of the projections when the tire is depressed.

2. A cushion tire comprising a body substantially horseshoe-shaped in cross section, said body having annular pockets formed on the inner sides of the legs thereof, an expansible member having reinforced edges to removably engage said pockets, projections extending into the cavity formed and adapted to engage the expansible member when the tire is depressed, and elastic means for connecting said projections.

3. A tire comprising a hollow annular member, a plurality of semi-rigid ribs connected to and forming part of said tire and projecting inwardly from the wall of the same, and an elastic webbing attached to and connecting said ribs.

4. A tire comprising a hollow annular member substantially horseshoe-shaped in cross section, said tire having a continuous annular air pocket adjacent its tread formed by independent separable semi-rigid portions of the inner wall of the tire projecting inwardly in the shape of ribs and an elastic webbing connected to said ribs.

5. A tire comprising a hollow annular member, independent semi-rigid projections forming part of and extending inwardly from the wall of said member, and an elastic webbing connecting said projections, said webbing having side flanges gradually decreasing in thickness in engagement with the outer surface of the projections, and a thicker portion between said side flanges.

In testimony whereof, we have signed our names to this specification, in the presence of two subscribing witnesses.

GILES S. DOTY.
JOHN D. SHOW.

Witnesses:
MURRAY C. BOYER,
WM. A. BARR.